(12) United States Patent
Miyamoto et al.

(10) Patent No.: US 10,427,474 B2
(45) Date of Patent: Oct. 1, 2019

(54) PNEUMATIC TIRE

(71) Applicant: TOYO TIRE & RUBBER CO., LTD., Osaka-shi, Osaka (JP)

(72) Inventors: Takeshi Miyamoto, Osaka (JP); Hiroshi Nashio, Osaka (JP)

(73) Assignee: TOYO TIRE CORPORATION, Itami-shi (JP)

( * ) Notice: Subject to any disclaimer, the term of this patent is extended or adjusted under 35 U.S.C. 154(b) by 191 days.

(21) Appl. No.: 15/421,629

(22) Filed: Feb. 1, 2017

(65) Prior Publication Data
US 2017/0232804 A1 Aug. 17, 2017

(30) Foreign Application Priority Data

Feb. 15, 2016 (JP) ................. 2016-026225

(51) Int. Cl.
*B60C 13/00* (2006.01)
*B60C 13/02* (2006.01)
*B60C 17/00* (2006.01)

(52) U.S. Cl.
CPC .......... *B60C 13/02* (2013.01); *B60C 17/0009* (2013.01)

(58) Field of Classification Search
CPC ..... B60C 13/00; B60C 13/001; B60C 13/002; B60C 13/003; B60C 13/02; B60C 13/023; B60C 15/024; B60C 15/0242
See application file for complete search history.

(56) References Cited

U.S. PATENT DOCUMENTS

| | | | |
|---|---|---|---|
| 2009/0032161 A1 | 2/2009 | Yamaguchi | |
| 2010/0038001 A1 | 2/2010 | Yamaguchi | |
| 2012/0085473 A1 | 4/2012 | Matsuo et al. | |

FOREIGN PATENT DOCUMENTS

| CN | 102448739 A | | 5/2012 |
|---|---|---|---|
| JP | 2013-71634 A | | 4/2013 |
| JP | 2014-80099 | * | 5/2014 |
| WO | 2007/032405 A1 | | 3/2007 |
| WO | 2008/114668 A1 | | 9/2008 |

OTHER PUBLICATIONS

Office Action dated Jun. 28, 2018, issued in counterpart Chinese Application No. 201710056698.2, with English translation. (13 pages).

Office Action dated Feb. 19, 2019, issued in counterpart CN Application No. 201710056698.2, with English translation. (11 pages).

* cited by examiner

*Primary Examiner* — Justin R Fischer

(74) *Attorney, Agent, or Firm* — Westerman, Hattori, Daniels & Adrian, LLP

(57) ABSTRACT

Durability of a pneumatic tire is enhanced by effectively promoting heat radiation by air cooling. A plural of projections are comprised on a surface of a tire side portion. The projection comprises a front side surface which is a side surface of a tire rotational direction side and an outer end surface which is a side surface of a tire outer radial direction side. The front edge portion intersects a straight line extending in a tire radial direction as viewed in a tire wide direction. A tip angle made by the top surface and the front side surface on the edge portion of the projection is equal to or less than 100°. The outer end surface comprises a projection having an inclination side surface which is inclined in a tire rotating rivers direction toward a tire outer radial direction.

10 Claims, 14 Drawing Sheets

PNEUMATIC TIRE

CROSS-REFERENCE TO RELATED APPLICATIONS

This application claims priority from Japanese Patent Application No. 2016-026225 filed on Feb. 15, 2016, the disclosure of which is incorporated herein by reference in their entireties.

BACKGROUND OF THE INVENTION

Technical Field

The present invention is related to a pneumatic tire.

Related Art

International Publication WO2007/032405 and International Publication WO2008/114668 disclose a run flat tire where a plurality of projections is formed on tire side portions for air cooling. These projections intend to create turbulence in an air flow on surfaces of the tire side portions along with the rotation of the tire. Due to the creation of turbulence, a velocity gradient of an air flow in the vicinity of the surface of the tire side portion is increased and, hence, a heat radiation property of the tire is enhanced.

SUMMARY OF THE INVENTION

However, neither International Publication WO2007/032405 nor International Publication WO2008/114668 discloses the enhancement of a heat radiation property by techniques other than the creation of turbulence in an air flow in the vicinity of a surface of the tire side portion.

Accordingly, it is an object of the present invention to provide a pneumatic tire whose durability can be enhanced by effectively promoting heat radiation by air cooling.

Inventors of the present invention have made extensive studies on optimization of a velocity gradient of an air flow in the vicinity of a surface of a tire side portion. It has been known that when an object (for example, a flat plate) is disposed in the flow of a fluid, a speed of the fluid is rapidly lowered in the vicinity of a surface of the object due to viscosity of the fluid. Outside a region where the speed of the fluid rapidly changes (a boundary layer), a region where the speed of the fluid is not influenced by viscosity is formed. A thickness of the boundary layer is increased toward a downstream side from a front edge of the object. Although the boundary layer in the vicinity of the front edge of the object is a laminar flow (a laminar-flow boundary layer), the laminar-flow boundary layer is turned into a turbulent flow (a turbulent flow boundary layer) as the laminar-flow boundary layer flows toward a downstream side through a transitional region. Inventors of the present invention have found out that a velocity gradient of the fluid is large in the laminar-flow boundary layer so that heat radiation efficiency from the object to the fluid is high, and have completed the present invention based on such finding. That is, the inventors of the present invention have come up with an idea of applying a high heat radiation property in the laminar-flow boundary layer to air cooling of the pneumatic tire. The present invention has been made based on such a novel idea.

According to one aspect of the present invention, a pneumatic tire comprising projections on a surface of a tire side portion, wherein the projection comprises a front side surface which is a side surface of a tire rotational direction side and an outer end surface which is a side surface of a tire outer radial direction side, the front edge portion intersects a straight line extending in a tire radial direction as viewed in a tire wide direction, a tip angle made by the top surface and the front side surface on the edge portion of the projection is equal to or less than 100°, the outer end surface comprises a projecting portion having an inclination side surface which is inclined in a tire rotating rivers direction toward a tire outer radial direction.

With this configuration, air flow can be divided into a first flow and a second flow, and the first flow can flow along the top surface and the second flow can flow along the front side surface. Thus, it becomes easy to flow the first flow as fast laminar flow and it enables heat radiation thereof to enhance.

Moreover, since the projecting portion is formed on the outer end surface of the projection, a direction of the second flow along the front side surface is conformed to a direction along the inclination side surface of the projecting portion. This enables air remaining at the back side surface side of the projection to flow by the pulling of the second flow and to further enhance the heat radiation thereof.

According to the present invention, since the tip angle of the projection is made to be equal to or less than 100°, air flow on a surface of the tire side portion can be divided to a first flow at the top surface side and a second flow at the front side surface side. As a result of this, the first flow on the top surface can be made to a fast laminar flow and a heat radiation at the projection can be enhanced. Since a projecting portion is formed on an outer end surface of the projection, the second flow can be transformed to a direction along the inclination side surface. This enables air remaining at the back side surface side of the projection to flow and to further enhance the heat radiation.

BRIEF DESCRIPTION OF THE DRAWINGS

The foregoing and the other feature of the present invention will become apparent from the following description and drawings of an illustrative embodiment of the invention in which.

DETAILED DESCRIPTION OF THE PREFERRED EMBODIMENT

Hereinafter, embodiments of the present invention are described by reference to attached drawings. The description made hereinafter merely shows an example essentially, and does not intend to limit the present invention, products to which the present invention is applied, or its applications. Further, drawings are schematically shown and hence, ratios of respective sizes and the like may differ from actual ratios of sizes and the like.

First, the basic configuration of the embodiment of the present invention will be described.

Figure 1:
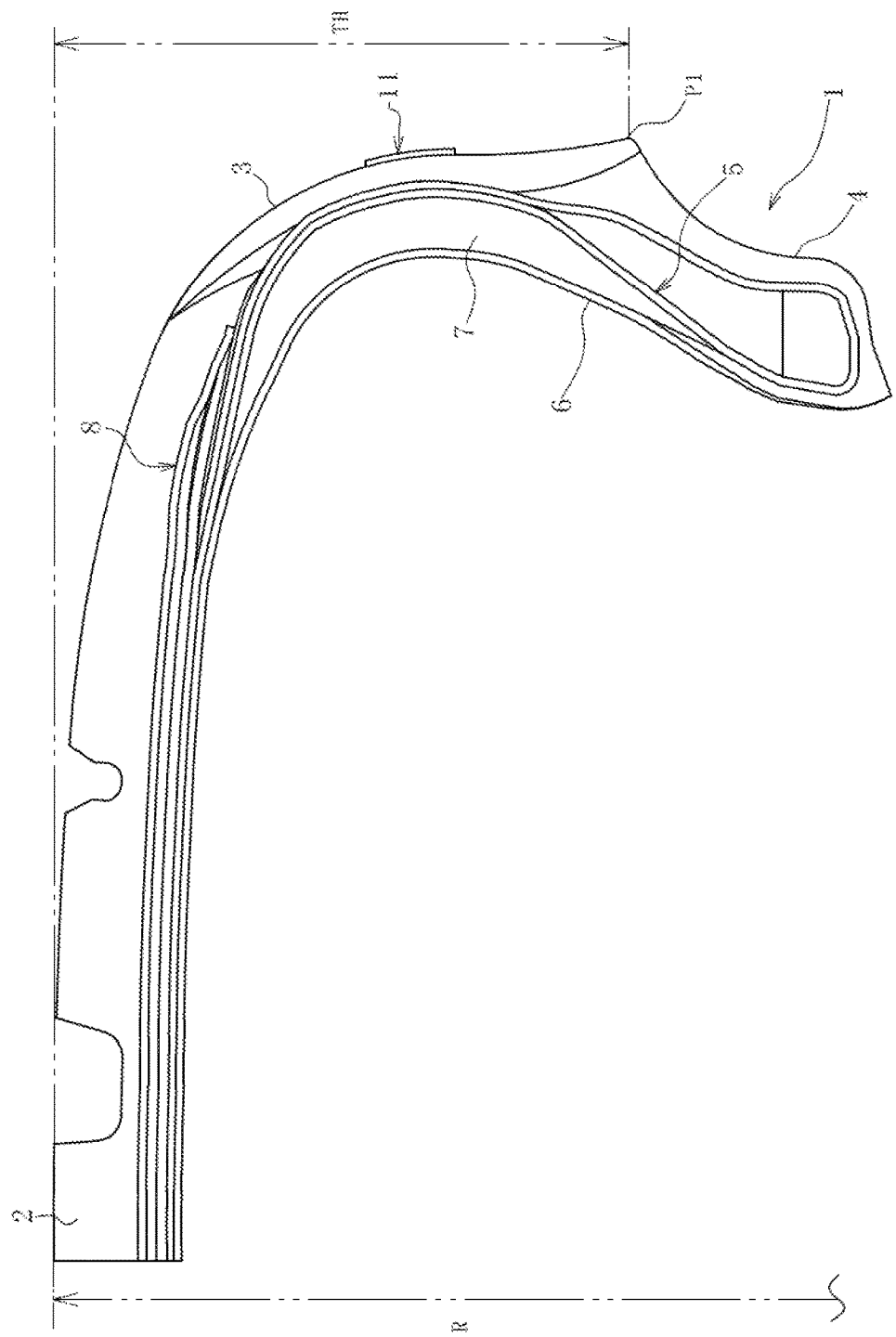
FIG. 1 is a meridian cross-sectional view of a pneumatic tire according to a first embodiment of the present invention.

FIG. 1 shows a half sectional view of the tire meridian of a rubber-made pneumatic tire (hereinafter referred to as a tire) 1. The tire 1 of this embodiment is a run-flat tire having a size of 245/40R18. The present invention is also applicable to tires having different sizes. The present invention is also applicable to tires not belonging to the category of run-flat tires. A rotational direction of the tire 1 is designated. The designated rotational direction is shown in FIG. 3 as an arrow RD.

The tire 1 includes a tread portion 2, a pair of tire side portions 3, and a pair of bead portions 4. Each bead portion 4 is disposed on an inner end portion of the tire side portion 3 in a tire radial direction (an end portion on a side opposite to the tread portion 2). A carcass 5 is disposed between the pair of bead portions 4. A reinforcing rubber 7 is disposed between the carcass 5 and an inner liner 6 on an innermost peripheral surface of the tire 1. A belt layer 8 is disposed between the carcass 5 and a tread surface of the tread portion 2. In other words, in the tread portion 2, the belt layer 8 is disposed outside the carcass 5 in a tire radial direction.

Figure 2:
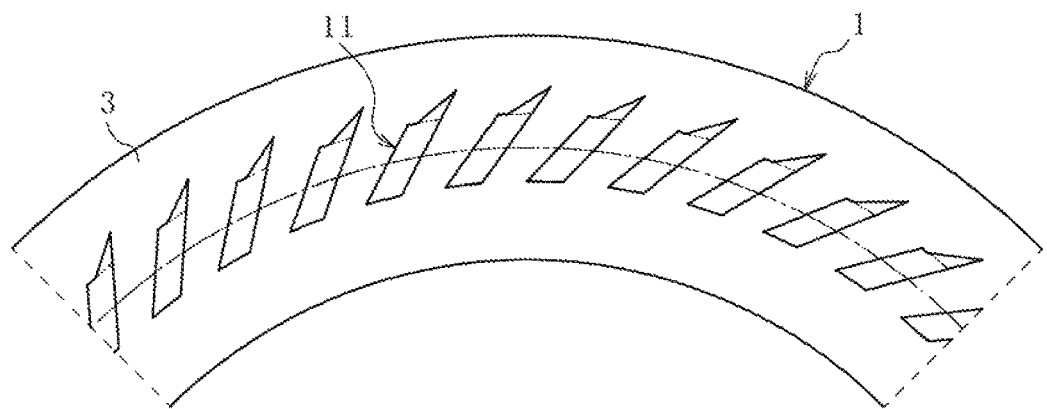
FIG. 2 is a side view of a portion of the pneumatic tire according to the first embodiment of the present invention.
Figure 3:
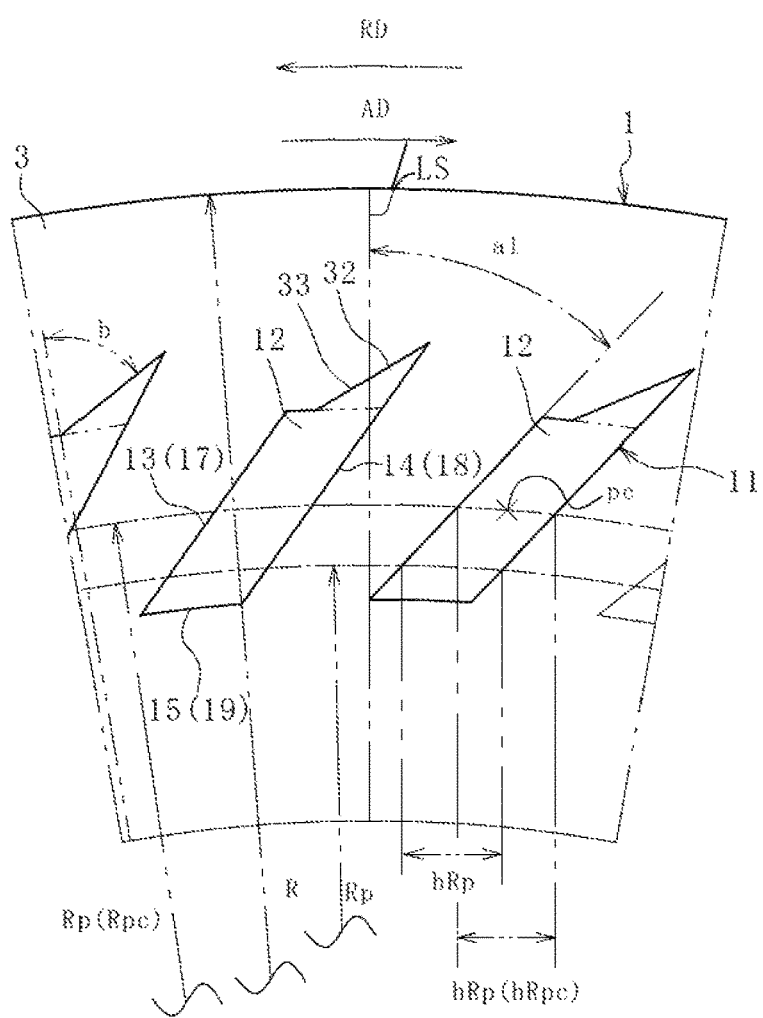
FIG. 3 is a partially enlarged view of the pneumatic tire shown in FIG. 2.

With reference to FIG. 2 and FIG. 3, a plurality of projections 11 is disposed on a surface of the tire side portion 3 at intervals in a tire circumferential direction. In this embodiment, these projections 11 have the same shape, the same size and the same posture. In FIG. 1, a distance from an outermost peripheral position P1 of a rim (not shown in the drawing) to an outermost position of the tread portion 1 in a tire radial direction (tire height) is indicated by symbol TH. The projection 11 can be disposed within a range of from 0.05 times to 0.7 times inclusive of the tire height TH from the outermost peripheral position P1 of the rim.

In this specification, there may be a case where "as viewed in a plan view" or terms similar to "as viewed in a plan view" are used with respect to the shape of the projection 11 as viewed in a tire width direction. There may be also a case where "as viewed in an end surface view" or terms similar to "as viewed in an end surface view" are used with respect to the shape of the projection 11 as viewed from an inner end surface 15 side described later.

Figure 4:
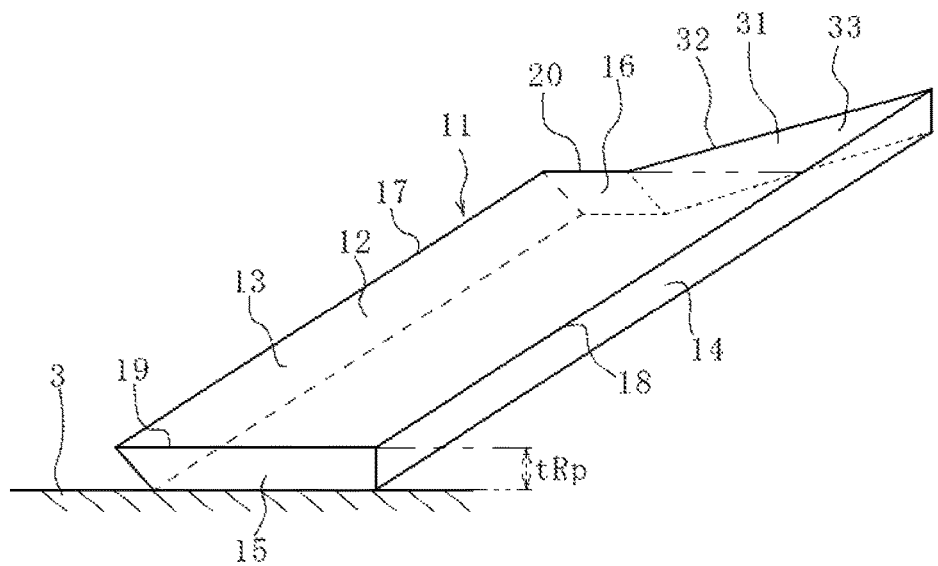
FIG. 4 is a perspective view schematically showing a projection.
Figure 5:
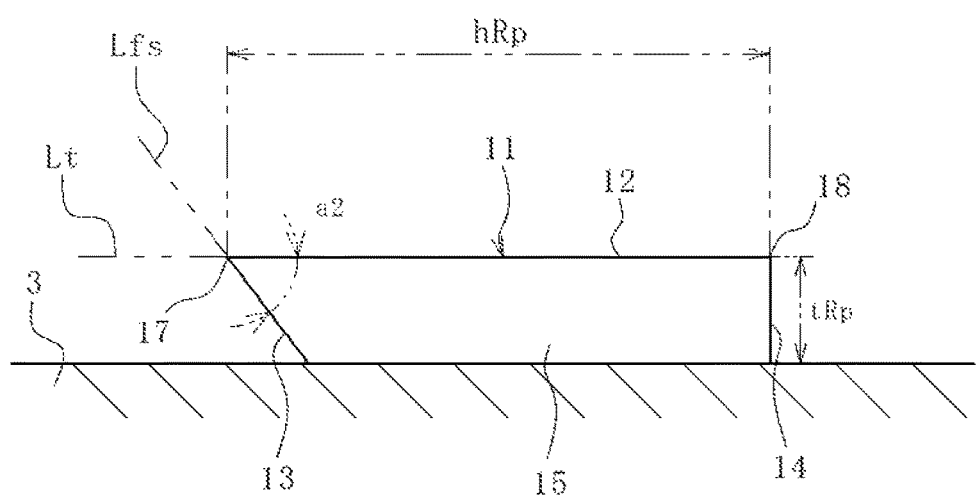
FIG. 5 is an end surface view of the projection.

With reference to FIG. 4 and FIG. 5, in this embodiment, the projection 11 includes a top surface 12 which is a flat surface expanding along a surface of the tire side portion 3. The projection 11 also includes a front side surface 13 and a back side surface 14. The front side surface 13 is positioned at the front side in the tire rotational direction RD. The back side surface 14 is positioned at the back side in the tire rotational direction RD (a tire reverse rotational direction). The projection 11 also has a pair of end surfaces disposed opposite to each other in the tire radial direction, that is, an inner end surface 15 disposed inside in the tire radial direction, and an outer end surface 16 disposed outside in the tire radial direction. A projecting portion 31 is formed on the outer end surface 16. The front side of a tire rotational direction RD of the projecting portion 31 is an inclination side edge portion 32, and an inclination side surface 33 extends toward the surface of the tire side portion 3. The top surface 12 is continuously provided from a top surface of the projecting portion 31, and the back surface 14 from a back surface thereof. As described later in detail, the front side surface 13 in this embodiment is a flat surface which is inclined with respect to a surface of the tire side portion 3 and the top surface 12. In this embodiment, the back side surface 14, the inner end surface 15 and the outer end surface 16 are flat surfaces extending substantially perpendicular to the surface of the tire side portion 3.

A front side edge portion 17 is a portion where the top surface 12 and the front side surface 13 intersect with each other. A back side edge portion 18 is a portion where the top surface 12 and the right side surface 14 intersect with each other. An inner side edge portion 19 is a portion where the top surface 12 and the inner edge surface 15 intersect with each other. An outer side edge portion 20 is a portion where the top surface 12 and the outer edge surface 16 intersect with each other. An inclination side edge portion 32 is a portion where the inclination side surface 33 and the top surface 12 intersect with each other. As in the case of this embodiment, the front side edge portion 17, the back side edge portion 18, the inner side edge portion 19, the outer side edge portion 20, and the inclination side edge portion 32 may be formed of an acute or clear edge. However, these side edge portions may have a shape that is curved to some extent or is chamfered as viewed in an end surface view. In this embodiment, all of the front side edge portion 17, the back side edge portion 18, the inner side edge portion 19, and the outer side edge portion 20 have a linear shape as viewed in a plan view. However, these side edge portions may have a curved shape such as an arcuate shape or an elliptical shape as viewed in a plan view. Further, as shown in FIG. 14C to FIG. 14E, these side edge portions may have a shape formed of a bent line which is made of a plurality of straight lines or may have a shape formed of a combination of a straight line and a curved line.

With reference to FIG. 3, the front side edge portion 17 (the front side surface 13) is inclined with respect to a straight line which passes the front side edge portion 17 and extends in the tire radial direction as viewed in a plan view. In other words, the front side edge portion 17 is inclined with respect to the tire radial direction. An inclination angle a1 of the front side edge portion 17 with respect to the tire radial direction is defined as an angle (a clockwise direction being a positive direction as viewed in a plan view) made by a reference straight line Ls1, which passes the position of a foremost side of the front side edge portion 17 in the tire rotational direction RD and extends in the tire radial direction, and the direction along which the front side edge portion 17 extends (in this embodiment, the front side edge portion 17 per se which is a straight line).

The front side edge portion 17 (the front side surface 13) is not only inclined in a liner manner as viewed in a plane view, but also is curved. In short, the front side edge portion 17 may be displaced at either of a tire circumferential direction toward a tire outer radial direction.

This enables the front side edge portion 17 to divide a flow into a first flow (a main flow) along the top surface 12 and a second flow (a dependent flow) along the front side surface 13. Since the second flow can be divided from a flow along the tire side portion 3, the first flow along the top surface 12 can be a fast laminar flow condition, and the scope of laminar boundary layer LB can be expanded.

It is preferable that the frond side surface 13 is displaced in a tire reverse rotational direction toward a tire outer radial direction.

This enables the second flow to coincide in a direction of centrifugal force which affects air passing the surface of the tire side portion 3. Therefore, the second flow can be more smoothly.

Figure 7:
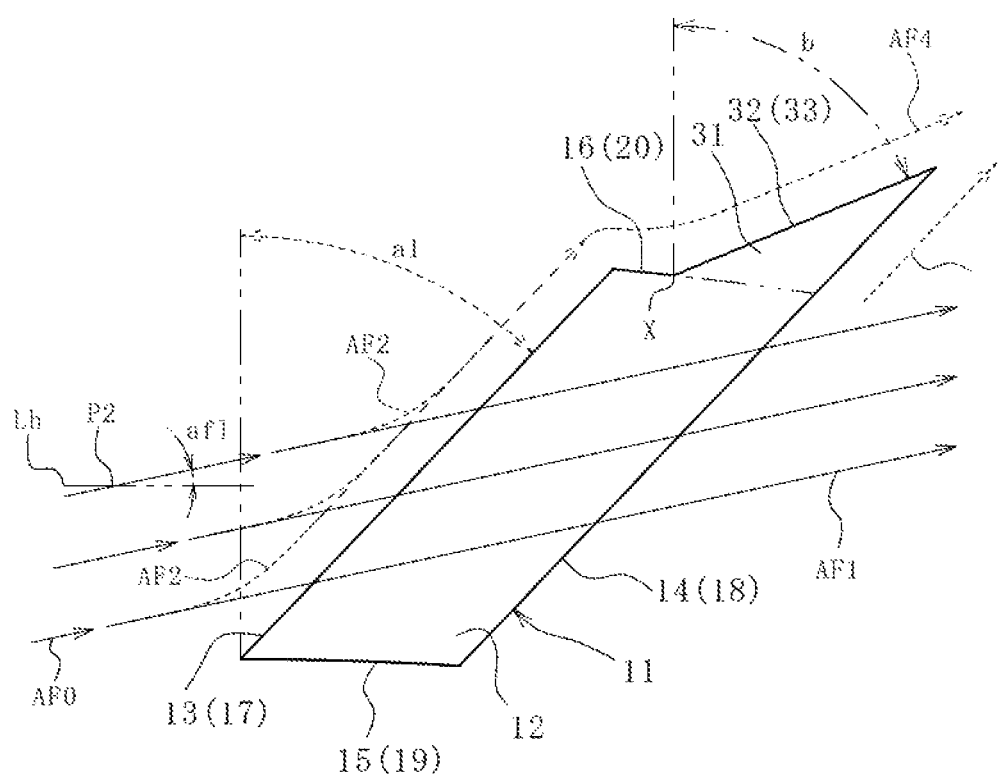
FIG. 7 is a plan view of the projection for describing an air flow path.

With reference to FIG. 7, an inclination side edge portion 32 intersects the outer side edge portion 20 and has an inclination angle b with respect to a straight line extending toward a tire radial direction through the intersection point X thereof as viewed in a plane view. The inclination angle b satisfies 10°≤b≤45° and is respectively smaller than an inclination angle a1 of the front side edge portion 17 described below. That is, a flow direction against the second flow AF2 along the front side surface 13 can be transformed to a fourth flow AF4 approaching closer to a direction along the back side edge portion 18. Air reservoir near the back side surface 14 can be pulled and flowed by the second flow AF2 after passing through the projecting portion 31. This enables to eliminate the air reservoir and also improve heat radiation therein. The intersection point X may be coincided with a corner portion A which is an intersection point of the front side edge portion 17 and the outer side edge portion 20, or may be anywhere on the outer side edge portion 20.

Figure 12:
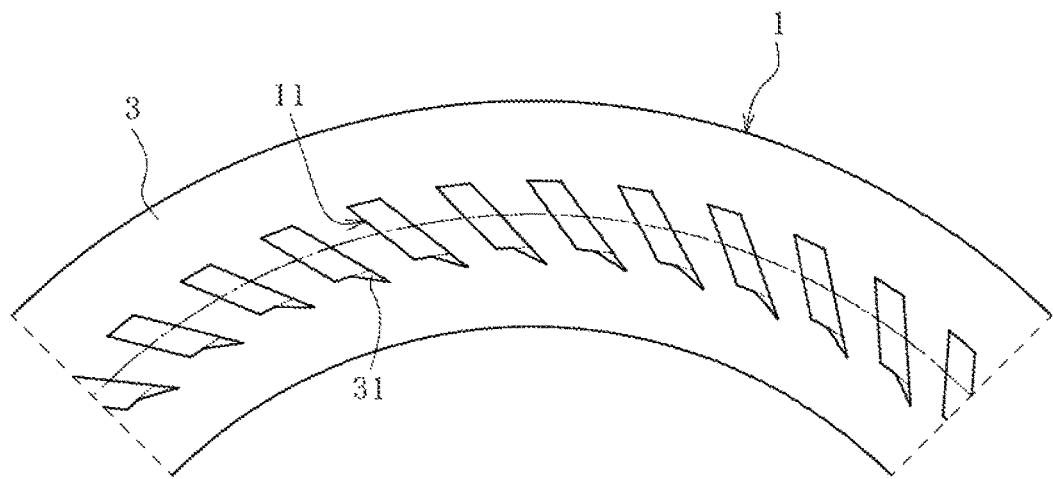
FIG. 12 is a side view of a portion of a pneumatic tire including projections each having inclination angles of side portions different from inclination angles of front edge portion according to the first embodiment.
Figure 13:
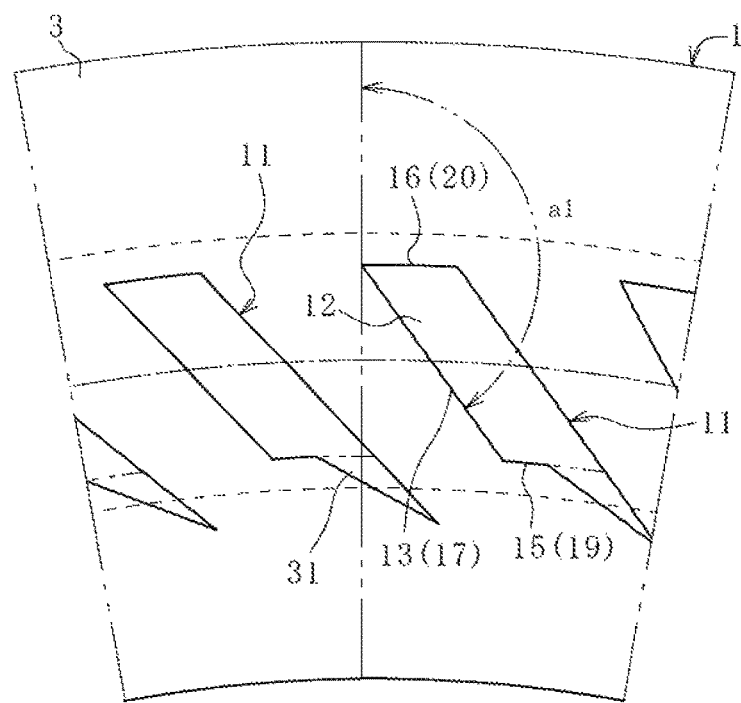
FIG. 13 is a partially-enlarged view of FIG. 12.

The front side edge portion 17 according to the present embodiment extends rightward and upward as viewed in a plain view. As shown in FIG. 12 and FIG. 13, the projection 11 may be a shape which extends rightward and upward as viewed in a plain view. The back side edge portion 18 of the present embodiment extends substantially parallel to the front side edge portion 17 as viewed in a plain view. The inner side edge portion 19 and the outer side edge portion 20 of the present embodiment extend parallel to each other as viewed in a plain view. The projecting portion 31 is formed in a back side of the inside end surface 15 of the projection 11.

With reference to FIG. 3, symbol R indicates a tire radius, and symbol Rp indicates a distance from the center of rotation of the tire to an arbitrary position of the projection 11 in the tire radial direction. Symbol Rpc in FIG. 3 indicates a distance from the center of rotation of the tire to the center pc of the projection 11 (for example, the center of the top surface 12 as viewed in a plan view). Symbol hRp in FIG. 3 indicates a size of the projection 11 in the tire circumferential direction, that is, a width of the projection 11 at an arbitrary position in the tire radial direction.

Also with reference to FIG. 5, in this embodiment, a thickness tRp of the projection 11 at an arbitrary position of the projection 11 in the tire radial direction is fixed. That is, the projection 11 has the uniform thickness tRp in the tire radial direction. In this embodiment, the thickness tRp of the projection 11 is also fixed from the front side surface 13 (front side edge portion 17) to the back side surface 14 (back side edge portion 18). That is, the projection 11 has the uniform thickness tRp also in the tire circumferential direction.

Figure 6:
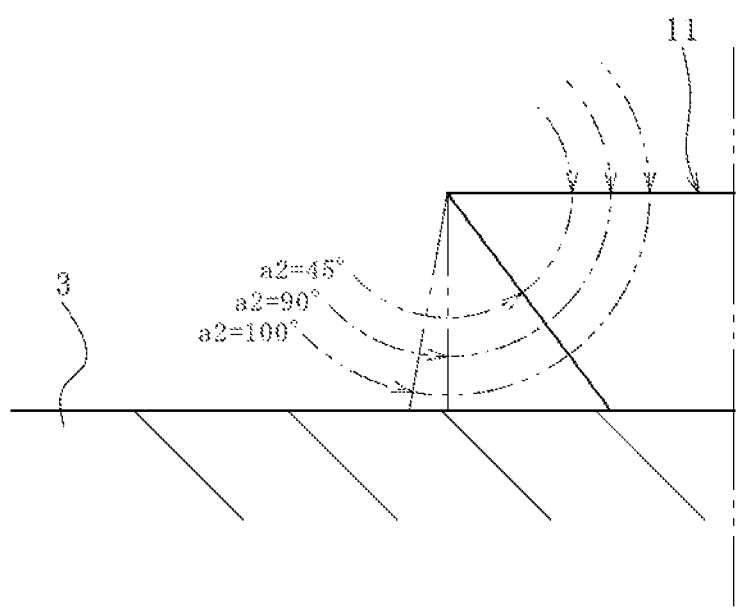
FIG. 6 is an end surface view of a portion of the projection for describing an angle of a tip end.

With reference to FIG. 5 and FIG. 6, as viewed in an end surface view, the top surface 12 and the front side surface 13 of the projection 11 make a certain angle (first tip end angle a2) on the front side edge portion 17. In this embodiment, the front side surface 13 has an inclination such that a distance between the top surface 12 and the front side surface 13 of the projection 11 is gradually narrowed toward a front side edge portion 17 so as to have a tapered shape. In other words, the inclination of the front side surface 13 is set so that the lower end of the front side surface 13 is positioned at the back side of the tire rotational direction RD compared with the front side edge portion 17. Since the front side surface 13 has such an inclination, the tip end angle 2a of the projection 11 in this embodiment is made of an acute angle (45°). The definition of the tip end angle 2a is specifically described later. The inclination side surface 33 may be formed as tip end angle 2a similar to the front side surface 13, however, it is not formed as the similar angle, for example, it may be formed as a plane surface extending generally perpendicular to the surface of the tire side portion 3 similar to the outer end surface 16.

Figure 8:
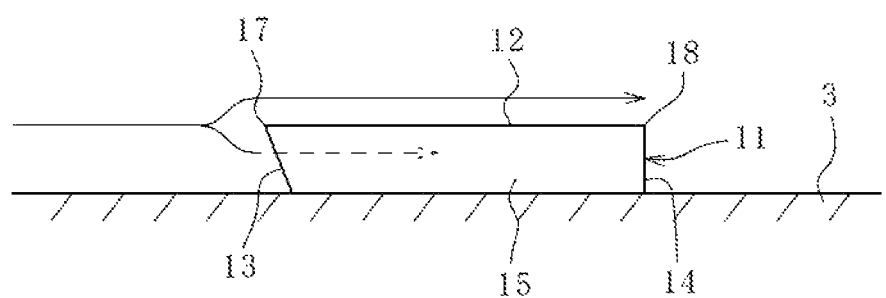
FIG. 8 is an end surface view of the projection for describing an air flow path.
Figure 9:
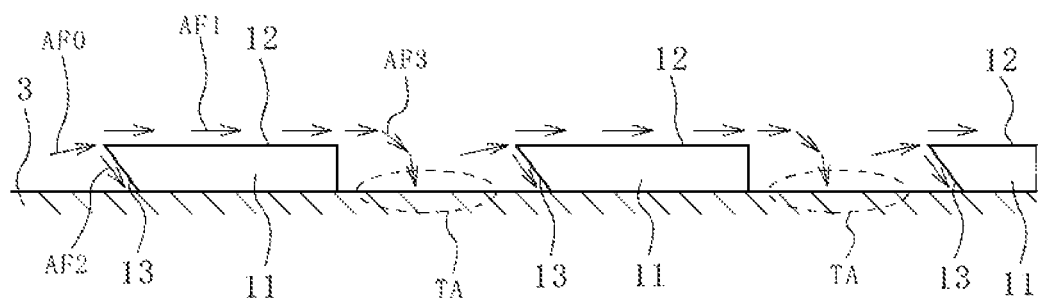
FIG. 9 is a schematic view for describing the projections and an air flow path between the projections.

With reference to FIG. 7 to FIG. 9, as conceptually indicated by an arrow AF0, when a vehicle attached with tires 1 travels, an air flow which flows to the projection 11 from a front side edge portion 17 is generated in the vicinity of the surface of the tire side portion 3. With reference to FIG. 7, the air flow AF0 at a specific position P2 on the surface of the tire side portion 3 has an angle (flow-in angle afl) with respect to a perpendicular (horizontal line Lh) drawn from a straight line which passes the position P2 and extends in the tire radial direction. According to a result obtained from an analysis made by the inventors of the present invention, on conditions that a tire size is 245/40R18, a distance Rpc from the center of rotation of the tire to the center Pc of the projection 11 is 550 mm, and a traveling speed of the vehicle is 80 km/h, the flow-in angle afl is 12°. When the traveling speed changes within a range of from 40 to 120 km/h, the flow-in angle afl changes by an approximately ±1°. In an actual use of the tire, the tire is influenced by various factors including a head wind, a structure of the vehicle and the like in addition to a traveling speed and, hence, it is regarded that the flow-in angle afl under the previously-mentioned conditions takes a value which falls within a range of approximately 12±10°.

Continuously with reference to FIG. 7 to FIG. 9, an air flow AF0 flows to the projection 11 from the front side edge portion 17 and is divided into two air flows at the time of flowing to the projection 11. As shown in FIG. 7 most clearly, one air flow AF1 flows over the top surface 12 from the front side surface 13 and flows toward the back side edge portion 18 from the front side edge portion 17 along the top surface 12 (main air flow: a first flow). The other air flow AF2 flows toward the outside in the tire radial direction along the front side surface 13 (sub air flow: second flow). The second flow AF2 is transformed to the projecting portion 31 side at the end of the front side surface 13 and becomes fourth flow AF4 along the inclination surface 33. The inclination side surface 33 has an inclination angle b closer to the back side surface 14 than the front side surface 13 in the tire radial direction. Therefore, air reservoir near the back side surface 14 of the projection 11 is pulled and similarly flows by the fourth flow AF4 passing through the inclination side surface 33. As shown in FIG. 12 and FIG. 13, when the front side edge portion 17 is formed to be extending rightward and downward, the air flow AF2 flows toward the inside in the tire radial direction along the front side surface 13.

Figure 10:
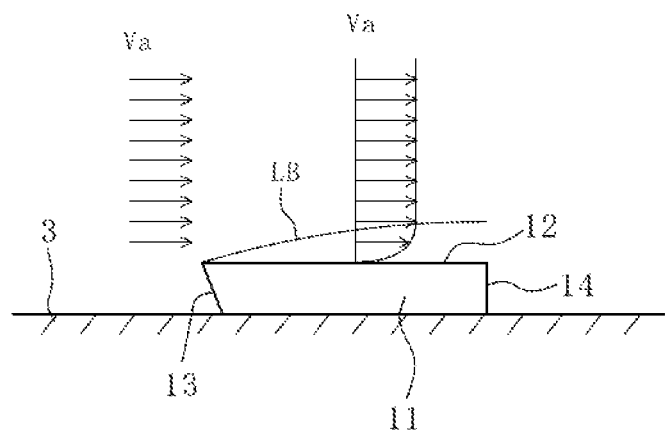
FIG. 10 is an end surface view of the projection for describing a boundary layer.

Also with reference to FIG. 10, the air flow AF1 which flows along the top surface 12 of the projection 11 forms a laminar flow. That is, a laminar-flow boundary layer LB is formed in the vicinity of the top surface 12 of the projection 11. In FIG. 10, symbol Va conceptually indicates a velocity gradient of the air flows AF0, AF1 in the vicinity of the surface of the tire side portion 3 and in the vicinity of the top surface 12 of the projection 11. Since the air flow AF1 which is a laminar flow has a large velocity gradient, heat is radiated from the top surface 12 of the projection 11 to the air flow AF1 with high efficiency. In other words, the air flow AF1 on the top surface 12 of the projection 11 forms a laminar flow and, hence, heat radiation by air cooling can be effectively promoted. Since the air reservoir of the back side surface 14 of the projection 11 is pulled by the fourth flow AF4, heat radiation on the back side surface 14 can be also effectively promoted. Due to such effective air cooling, promotion of aging variation of tire constituent material, etc. generated by temperature rise is reduced and durability of the tire 1 is enhanced.

As indicated by an arrow AF3 in FIG. 9, an air flow which passes along the top surface 12 and flows toward a downstream side from the back side edge portion 18 impacts the surface of the tire side portion 3 from the top surface 12, and is transformed. As a result, heat radiation from the surface of the tire side portion 3 between the projections 11, 11 is promoted.

As has been described heretofore, in the tire 1 of this embodiment, due to the laminarization of the first flow AF1 on the top surface 12 of the projection 11 and each effect of the impact of the third flow AF3 between the projections 11, 11 and the pulling of the air reservoir by the fourth air AF4 passing through the inclination side surface 33 of the projecting portion 31, a heat radiation property of the tire 1 is enhanced.

Figure 11:
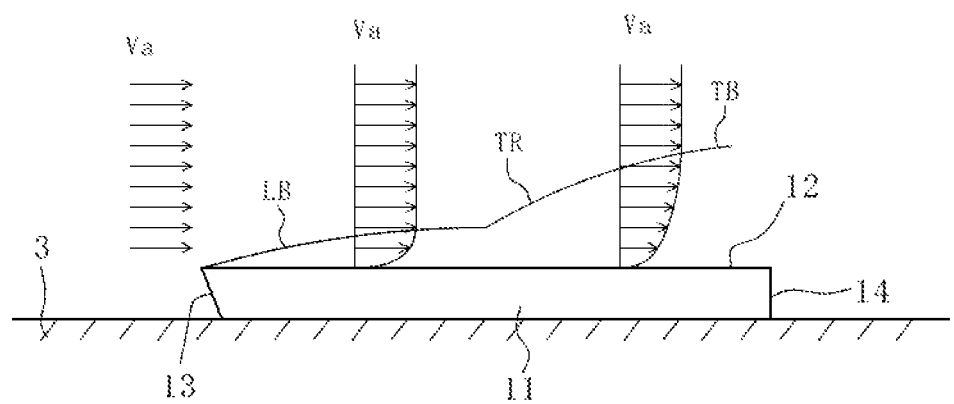
FIG. 11 is an end surface view of the projection for describing the boundary layer.

As described in detail later, it is preferable that the width hRp of the projection 11 at a position located at a distance Rp from the center of rotation of the tire (see FIG. 3) be set such that a laminar flow boundary layer LB is formed from one of the front side edge portion 17 and the back side edge portion 18 of the top surface 12 of the projection 11 to the other of the front side edge portion 17 and the back side edge portion 18. However, as conceptually shown in FIG. 11, the width hRp of the projection 11 is allowed to have a relatively long size where a velocity boundary layer forms a transitional region TR or a turbulent flow boundary layer LB on the right side edge portion 18 side (a downstream side) of the top surface 12 of the projection 11. Also in this case, in a region of the top surface 12 of the projection 11 where the laminar flow boundary layer LB is formed, the tire 1 can acquire an advantageous effect that a heat radiation property can be enhanced due to a large velocity gradient.

To divide the air flow AF0 into the air flows AF1, AF2 when the air flow AF0 flows to the projection 11 as described above, it is preferable that the thickness htp of the projection 11, particularly, the thickness htp of the projection 11 at portions corresponding to the front side edge portion 17 be set smaller than the width hp of the projection 11 (or a minimum width when the width hp is not fixed).

As described previously, the air flow AF0 which flows to the projection 11 has a flow-in angle afl. To divide the air flow AF0 into the air flows AF1, AF2, it is necessary to set the inclination angle a1 of the front side edge portion 17 and the inclination angle a3 of the right side edge portion 18 of the projection 11 as viewed in a plan view such that an entry angle of the air flow AF0 with respect to the front side edge portion 17 does not become 90°. In other words, as viewed in a plan view, it is necessary to incline the front side edge portion 17 of the projection 11 with respect to the air flow AF0.

With reference to FIG. 3, as in the case of this embodiment, when the front side edge portion 17 is inclined rightward and upward as viewed in a plan view, it is preferable to set the front side edge portion 17 such that the front side edge portion 17 intersects with the air flow AF0 which flows to the front side edge portion 17 at an angle of 45°. In this case, as described previously, an entry angle afl of the air flow AF0 is regarded as approximately 12±10° and, hence, it is preferable that the inclination angle a1 of the front side edge portion 17 be set to a value which falls within a range defined by the following formula (1).

$$23° \leq a1 \leq 43° \tag{1}$$

With reference to FIG. 13, when the front side edge portion 17 is inclined rightward and downward, it is preferable that the inclination angle a1 of the front side edge portion 17 be set such that the front side edge portion 17 intersects with the air flow AF0 which flows into the front side edge portion 17 at an angle of 45°. That is, it is preferable that the inclination angle a1 be set to a value which falls within a range defined by the following formula (2).

$$130° \leq a1 \leq 133° \tag{2}$$

In short, it is preferable that the inclination angle a1 of the front side edge portion 17 be set to satisfy the formula (1) or (2).

With reference to FIG. 5 and FIG. 6, to divide the air flow AF0 into the air flows AF1, AF2 when the air flow AF0 flows into the projection 11, it is necessary to prevent tip end angle a2 of the projection 11 from being set to excessively large values. To be more specific, it is preferable that the tip end angle a2 be set to 100° or less. It is more preferable that the tip end angle a2 be set to angle which is not more than 90°. It is not preferable that the tip end angle a2 be set to excessively small values because such setting of the tip end angle a2 causes lowering of strength of the projection 11 in the vicinity of the front side edge portion 17. Accordingly, it is preferable that the tip end angle a2 be set to a value which falls particularly within a range of from 45° to 65° inclusive.

With reference to FIG. 3, when the width hRp of the projection 11 at an arbitrary position in the tire radial direction is excessively narrow, an area of heat radiation from the projection 11 by the laminar flow boundary layer LB in the vicinity of the top surface 12 becomes insufficient and, hence, a sufficient heat radiation promoting effect by the laminar flow cannot be acquired. Accordingly, it is preferable that the width hRp of the projection 11 be set to 10 mm or more.

Further with reference to FIG. 3, it is preferable that the width hRp of the projection 11 at an arbitrary position in the tire radial direction be set such that the width hRp satisfies the following formula (3). In all formulae described hereinafter, an SI unit system is used.

$$10 \le hRp \times \left(\frac{Rp}{R}\right) \le 50 \tag{3}$$

R: tire radius R
Rp: distance from the center of rotation of tire to arbitrary position on projection
hRp: width of projection at position away from the center of rotation of tire by distance Rp When the width hRp is excessively small, a region where the velocity gradient is increased cannot be sufficiently ensured so that a sufficient cooling effect cannot be acquired. A lower limit value "10" in the formula (3) corresponds to a minimum dimension which can obtain the laminar flow boundary layer LB.

When the width hRp is excessively large, the velocity boundary layer grows excessively on the projection 11 so that a velocity gradient becomes small thus deteriorating a heat radiation property of the tire 1. An upper limit value "50" in the formula (3) is defined from such a viewpoint. Hereinafter, the reason why the upper limit value is set to 50 is described.

It has been known that the growth of a velocity boundary layer on a flat plate, that is, the transition from the laminar flow boundary layer LB to the turbulent flow boundary layer LB is expressed by the following formula (4).

$$x \cong 3 \times 10^5 \frac{v}{U} \tag{4}$$

x: distance from tip end of flat plate at which transition from laminar flow boundary layer to turbulent flow boundary layer occurs
U: flow-in velocity
v: kinematic velocity coefficient of fluid To take into account the influence of turbulence in a main flow and the lowering of a velocity gradient due to the growth of a boundary layer to some extent in the vicinity of the transition region, it is considered that a maximum value hRp_max of the width hRp of the projection 11 necessary for acquiring a sufficient cooling effect is approximately ½ of the distance x in the formula (4). Accordingly, the maximum width hRp_max of the projection 11 is expressed by the following formula (5).

$$hRp\_max \cong 1.5 \times 10^5 \frac{v}{U} \tag{5}$$

A flow-in speed U of a fluid to the projection 11 is expressed as a product of a distance Rp from the center of rotation of the tire to an arbitrary position of the projection 11 in the tire radial direction and a tire angular velocity (U=Rpω). A vehicle speed V is expressed as a product of a tire radius R and the tire angular velocity (V=Rω). Accordingly, the relationship expressed by the following formula (6) is established.

$$U = \frac{Rp}{R}V \tag{6}$$

With respect to a kinematic viscosity coefficient v of air, the following formula (7) is established.

$$v \cong 1.5 \times 10^{-5} \tag{7}$$

The following formula (8) is obtained by incorporating the formulae (6), (7) into the formula (5).

$$hRp\_max \cdot \frac{Rp}{R} \cong \frac{2.25}{V} \tag{8}$$

Assuming a vehicle speed V as 80 km/h, hRp_max is expressed by the formula (8).

$$hRp\_max \cdot \frac{Rp}{R} \cong 100 (mm)$$

To take into account a condition of traveling at a high speed where heat generation of the tire 1 becomes more outstanding, to be more specific, to take into account a vehicle speed V up to 160 km/h, hRp_max is expressed by the formula (8).

$$hRp\_max \cdot \frac{Rp}{R} \cong 50 (mm)$$

In this manner, to form the laminar flow boundary layer LB over the entire top surface 12 of the projection 11 in the width direction even during a state of traveling at a high speed (vehicle speed V: 160 km/h or below), an upper limit value of the formula (3) becomes 50 mm.

The present invention is not limited to the construction described in the above embodiment, and various modifications can be made.

In the above embodiment, although the projection 11 is comprised of three kinds of projections which have different width hRp, the projection 11 may be comprised of two kinds of projections or more than four kinds of projections. It is preferable that two kinds of projections 11 which have different width are provided by turns in the tire circumferential direction. However, a plenty of projections 11 may be provided by turns in one unit, and number of projections 11 of one unit may be set freely. In the case of more than three kinds of projections 11, it is similar.

When kinds of projections 11 which have different width are increased, enough heat radiation is improved by either of projections 11 regardless of the difference of the rotation speed of the tire 1.

It is preferable that the inclination angle a1 of the front edge portion 17 (the front side surface 13) is different in each projection 11. In this case, it is preferable that the inclination angle a1 satisfies the next formula with respect to a standard inclination angle as.

$$as-10° \leq a1 \leq as+10°$$

Herein, the standard inclination angle as is a value which can effectively cool down the surface of the projection 11 by an air flow (flow speed on the surface of the tire side portion 3 is important.) generated on the tire side portion 3 at a standard vehicle speed (for example 80 km). When the value satisfies as−10>a1, the inclination angle of the front side surface 13 of the projection becomes insufficient. Air does not flow along the front side surface, flow beyond it and easily flow to the top surface 12. As a result of this, the second flow on the top surface 12 is disturbed, and it is difficult to become a laminar flow, and hence a heat radiation is reduced. When the value satisfies a1>as+10°, the projection 11 is inclined excessively and it is difficult to form the second flow flowing on the top surface 12, and hence a heat radiation is reduced after all.

It is preferable that the inclination angle a1 of the front side surface 13 of the projection 11 satisfies the next formula with respect to a standard width hs of a tire circumferential direction and a width hn of a tire circumferential direction of a certain projection 11.

$$a1 = as - \alpha \times \left(1 - \frac{hn}{hs}\right)$$

Herein, the standard width hs of the tire circumferential direction is a value which can effectively cool down the projection 11 by air flow generated on the tire side portion 3 at a certain vehicle speed. Therefore, if a value which is obtained when the vehicle speed is low is determined as standard, hs becomes long. On the contrary, if a value which is obtained when the vehicle speed is high is determined as standard, hs becomes short. The term a is coefficient and here denoted as $\alpha=20$. The reason why $\alpha=20$ is denoted is for making an operation result of the formula become within +10° with respect to the standard inclination angle as since the ratio of the width hn of the projection 11 which is adopted to the standard width hs is supposed as 0.5 to 1.5 times.

The shape of the projection 11 as viewed in a plane view can also take several kinds of forms as described below.

Figure 14A:
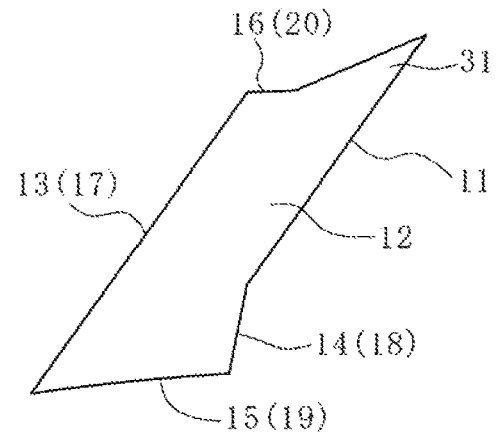
FIG. 14A is a view showing an alternative of the shape of the projection as viewed in a plan view.
Figure 14B:
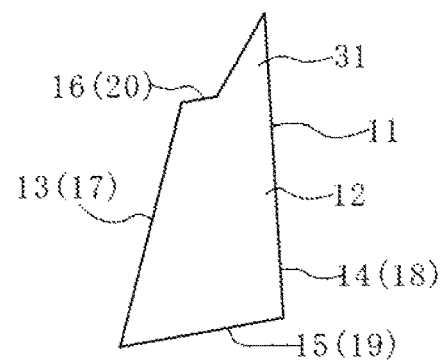
FIG. 14B is a view showing another alternative of the shape of the projection as viewed in a plan view.
Figure 14C:
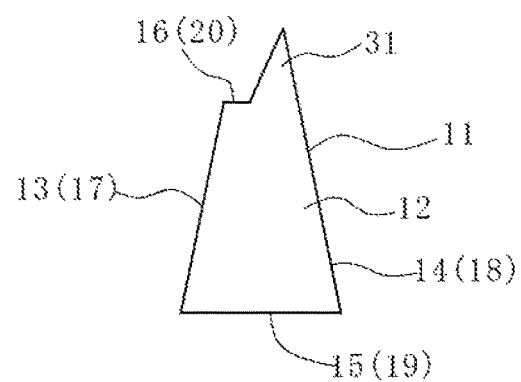
FIG. 14C is a view showing still another alternative of the shape of the projection as viewed in a plan view.

The back end portion 18 of the projection 11 of FIG. 14A has a shape made of two straight lines which have different inclination angle as viewed in a plane view. In the projection 11 of FIGS. 14B, 14C, the front end portion 17 extends rightward and upward, while the back end portion 18 extends rightward and downward as viewed in a plane view. In particular, the projection 11 of FIG. 14C has a shape of an isosceles trapezoid as viewed in a plane view. In all cases of FIGS. 14A to 14C, the projection 11 may be formed on the outer end surface 16.

In the case that the projection 11 is constituted by more than two kinds of projections which have different width hRp, it is preferable that each projection satisfies the following formula.

$$0.5 \times hs \leq hRp \leq 1.5 \times hs$$

In the case of 0.5×hs>hRp, since the width of the projection 11 becomes too narrow, it is difficult to utilize the extent of laminar flow of air flow. In the case of hRp>1.5×hs, it is not preferable from the point of a heat radiation since the top surface 12 is formed beyond the extent of laminar flow of air flow.

In the projection 11, an angle between the front side surface 13 of a tire rotational direction side and the top surface 12 of the projection 11 may be less than 100°, preferably equal to or less than 90°, more preferably less than 90°.

When the angle exceeds 100°, air flow becomes easily to flow to the top surface 12 side directly without dividing the air well on the front side surface 13 of the projection 11. This enables air flow condition on the top surface 12 not to maintain laminar flow, and a heat radiation on the projection 11 might become worse. The angle is made equal to or less than 90°, further less than 90°, and hence it is possible to divide the air flow at the front edge portion 17 more properly. It is also possible to further enhance the heat radiation by extending the extent of laminar flow boundary layer of air flow along the top surface 12.

Figure 15A:
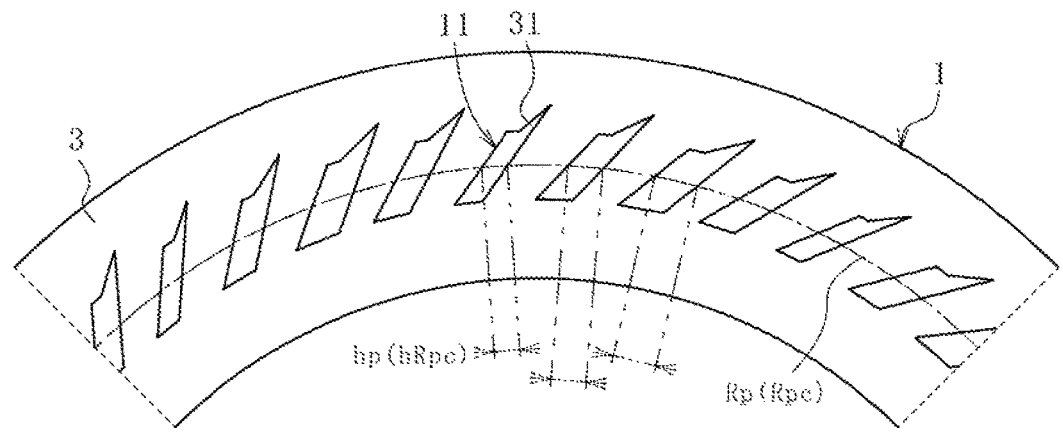
FIG. 15A is a view showing an alternative of the layout of the projection.

In FIG. 15A, two kinds of projections 11 having different width hRp are provided on the surface of the tire side portion 3 alternately.

Figure 15B:
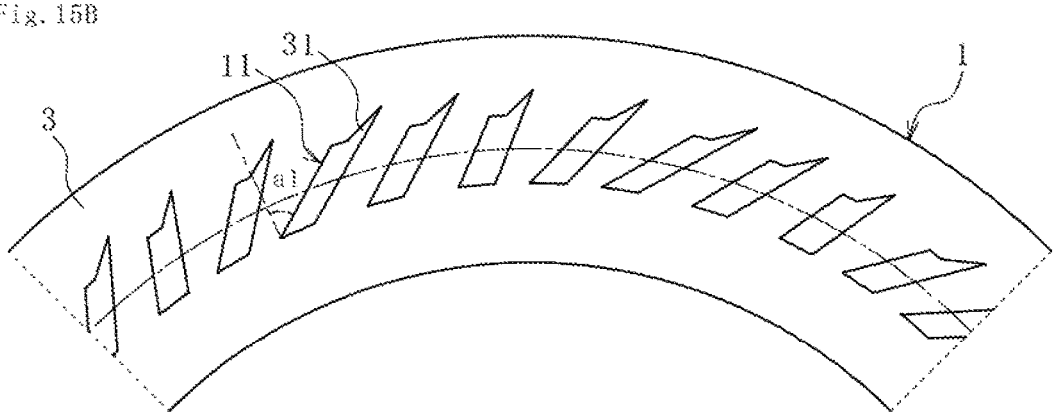
FIG. 15B is a view showing an alternative of the layout of the projection.
Figure 15C:
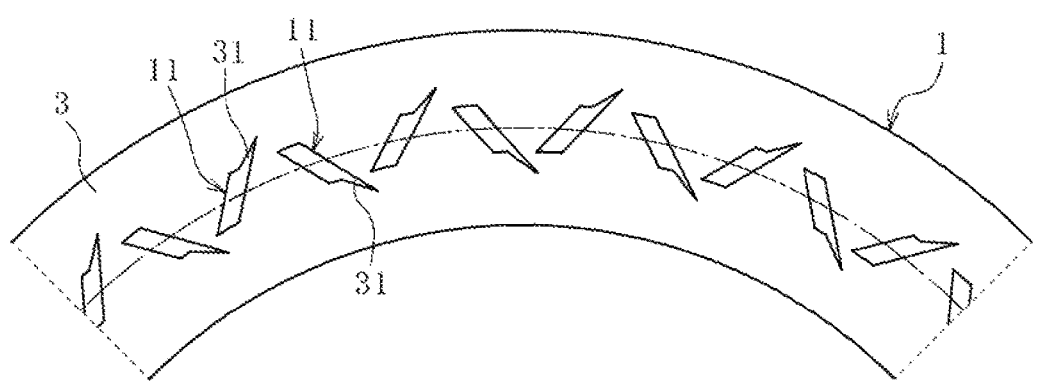
FIG. 15C is a view showing an alternative of the layout of the projection.

In FIGS. 15B and 15C, two kinds of projections 11 having different inclination angle a1 of the front edge portion 17 are provided on the surface of the tire side portion 3 alternately. In FIG. 15B, both of the two kinds of projections have the front edge portion 17 extending rightward and upward. In FIG. 15C, one of the two kinds of projections 11 has the front edge portion 17 extending rightward and upward and the other has the front edge portion 17 extending rightward and downward.

Figure 15D:
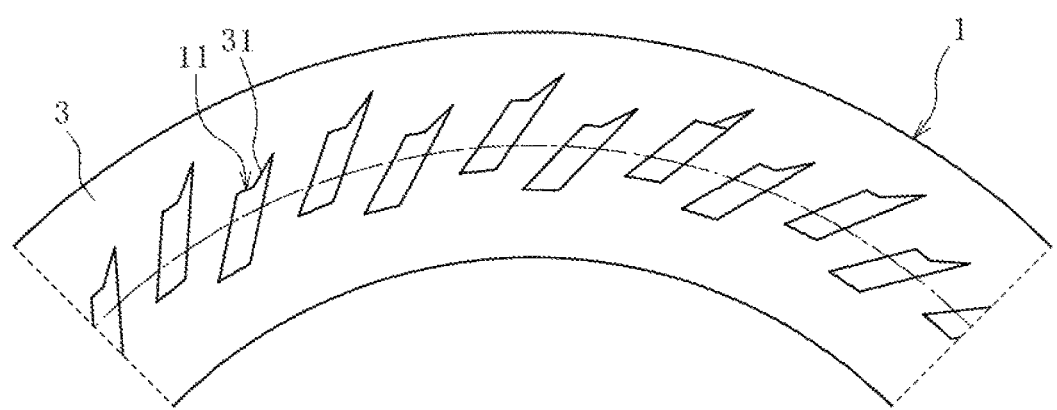
FIG. 15D is a view showing an alternative of the layout of the projection.

In FIG. 15D, two kinds of projections 11 having different position in the tire radial direction are provided on the surface of the tire side portion 3 alternately.

In all configurations of FIGS. 15A, 15B and 15D, the projecting portion 31 may be formed at the outer end surface 16 side. In the configuration of FIG. 15C, depending on the inclination of the projection 11, the projecting portion 31 may be formed on the outer end surface 16 if the projecting portion 31 is inclined rightward and upward, and the projecting portion 31 may be formed on the inner end surface 15 if the projecting portion 31 is inclined rightward and downward.

Figure 16A:
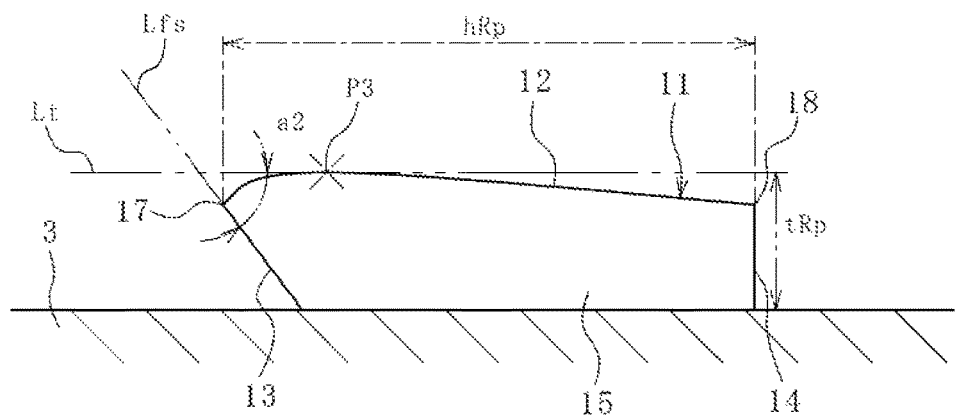
FIG. 16A is a view showing another alternative of the shape of the projection as viewed in an end surface view.
Figure 16B:
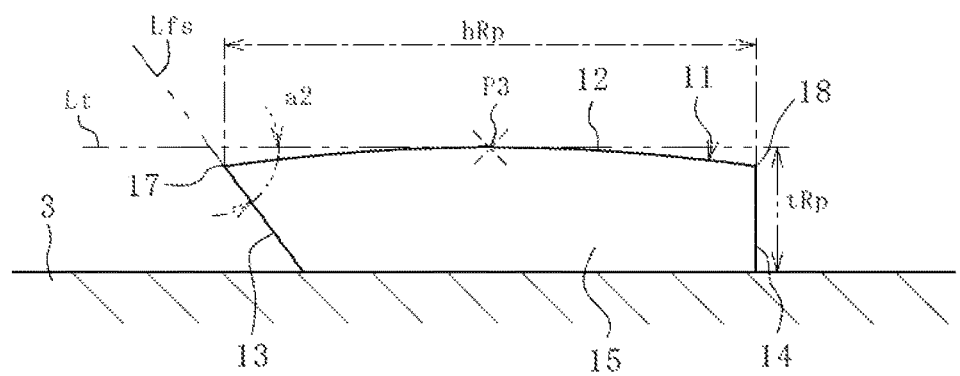
FIG. 16B is a view showing still another alternative of the shape of the projection as viewed in an end surface view.
Figure 16C:
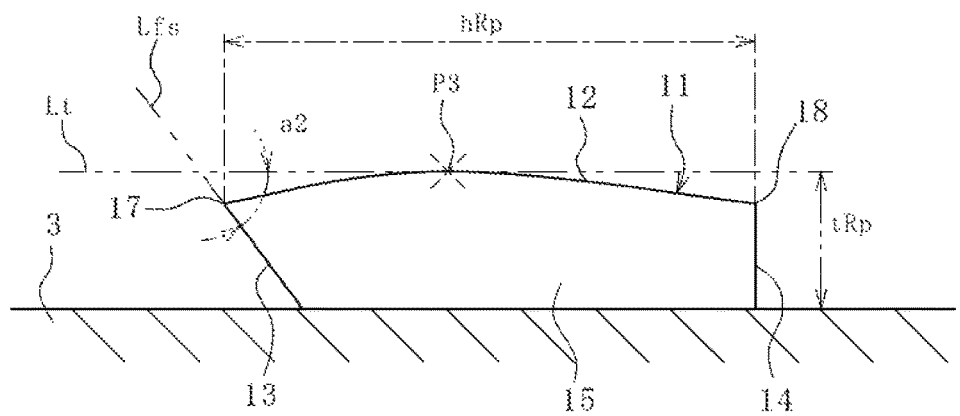
FIG. 16C is a view showing still another alternative of the shape of the projection as viewed in an end surface view.

FIGS. 16A to 16C indicate alternatives of the several shapes as viewed in the end surface view of the projection 11. The projection of FIG. 16A has the top surface 12 having airfoil profile as viewed in an end surface view. The projection 11 of FIG. 16B has the top surface 12 having circular arc profile of the top surface 12 as viewed in an end surface view. The projection 11 of FIG. 16C has the top surface 12 having curve profile, not airfoil profile and circular arc as viewed in an end surface view.

The front side surface 13 of each of the projections 11 as shown in FIG. 17A to FIG. 17D forms one recess 23 as viewed in an end surface view.

Figure 17A:
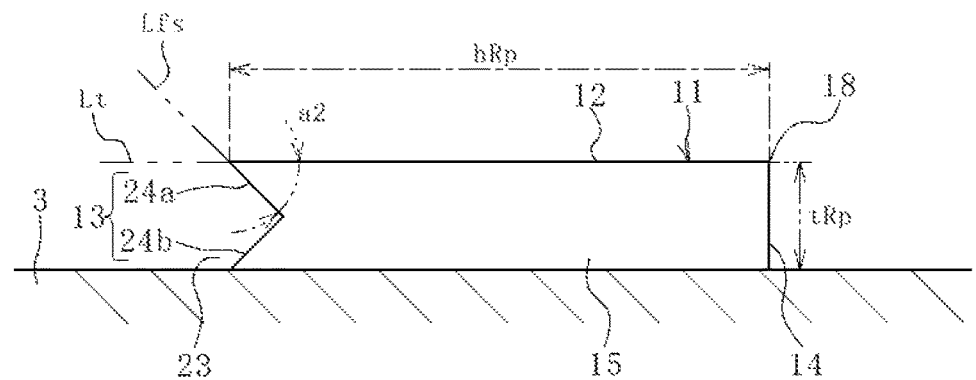
FIG. 17A is a view showing still another alternative of the shape of the projection as viewed in an end surface view.

The front side surface 13 of the projection as shown in FIG. 17A forms two flat surfaces 24a and 24b. As viewed in an end surface view, the flat surface 24a is inclined rightward and downward, the flat surface 24b rightward and upward. These flat surfaces 24a and 24b forms a triangle recess 23 as viewed in an end surface view.

Figure 17B:
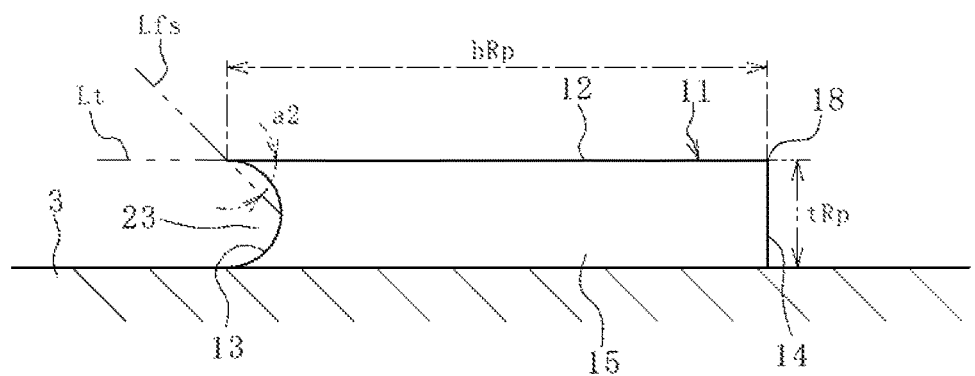
FIG. 17B is a view showing still another alternative of the shape of the projection as viewed in an end surface view.

The front side surface 13 of the projection 11 shown in FIG. 17B is formed of a curved surface having a semicircular cross-sectional shape. Recess 23 having a semicircular shape as viewed in an end surface view is formed by such a curved surface.

Figure 17C:
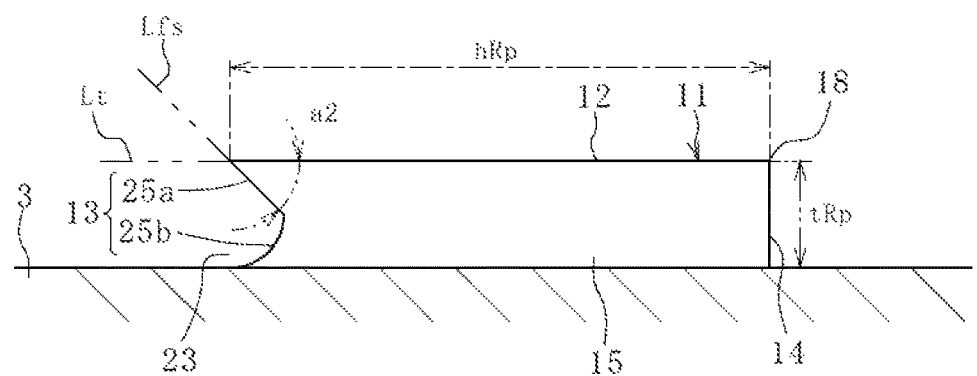
FIG. 17C is a view showing still another alternative of the shape of the projection as viewed in an end surface view.

The front side surface 13 of the projection 11 shown in FIG. 17C is formed of a flat surface 25a extending rightward and downward as viewed in an end surface view, and a curved surface 25b having a circular cross-sectional shape. The flat surface 25a is positioned on a top surface 12 side of the projection 11, and the curved surface 25b is positioned on a surface side of the tire side portion 3. Recess 23 is formed of the flat surface 25a and the curved surface 25b.

Figure 17D:
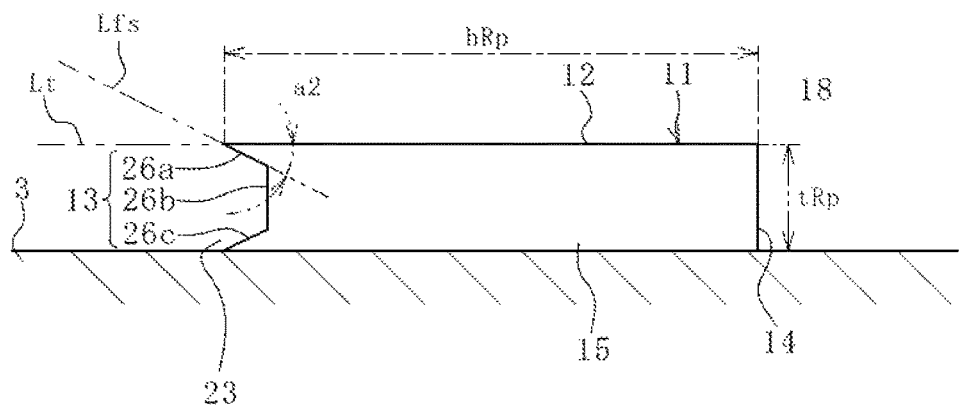
FIG. 17D is a view showing still another alternative of the shape of the projection as viewed in an end surface view.

Each one of the front side surface 13 of the projection 11 shown in FIG. 17D is formed of three flat surfaces 26a, 26b, and 26c. As viewed in an end surface view, the flat surface 26a of the projection 11 on a top surface 12 side extends rightward and downward, the flat surface 26c on a surface side of the tire side portion 3 extends rightward and upward, and the flat surface 26b at the center extends in a tire radial direction. Polygonal recess 23 is formed by these flat surfaces 26a to 26c.

Figure 18A:
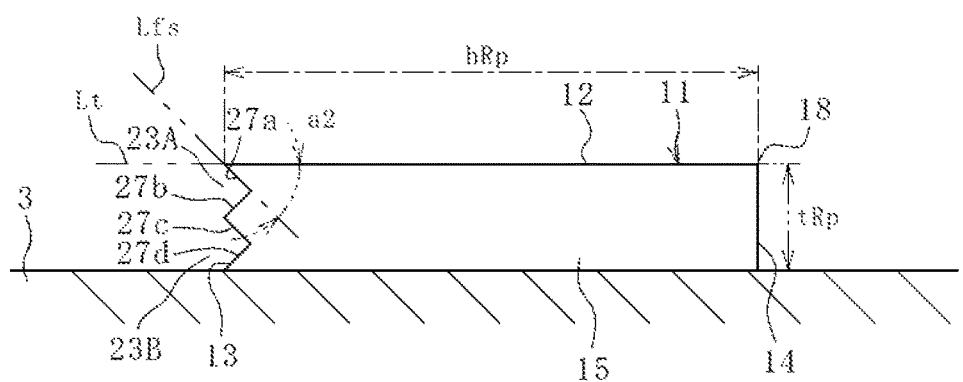
FIG. 18A is a view showing still another alternative of the shape of the projection as viewed in an end surface view.
Figure 18B:
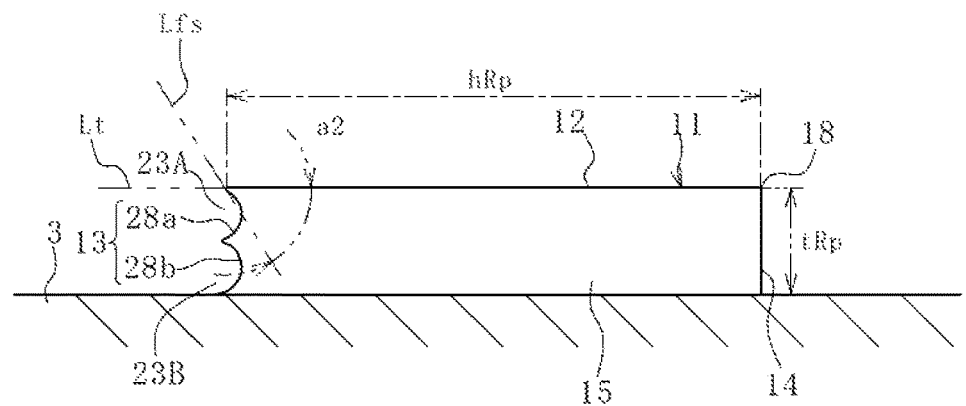
FIG. 18B is a view showing still another alternative of the shape of the projection as viewed in an end surface view.

Each one of the front side surface 13 the projection 11 shown in FIG. 18A and FIG. 18B is formed of two recesses 23A, 23B disposed adjacently to each other in a tire radial direction as viewed in an end surface view.

Each one of the front side surface 13 of the projection 11 shown in FIG. 18A is formed of four flat surfaces 27a to 27d. As viewed in an end surface view, the flat surface 27a of the projection 11 on a top surface 12 side extends rightward and downward, and the flat surface 27b which extends rightward and upward, the flat surface 27c which extends rightward and downward, and the flat surface 27d which extends rightward and upward are sequentially arranged toward a surface of the tire side portion 3. One recess 23A having a triangular cross-sectional shape is formed on the front side surface 13 and the right side surface 14 on a top surface 12 side of the projection 11 by the flat surfaces 27a, 27b, and one recess 23B having substantially the same triangular cross-sectional shape as the recess 23A is formed on the front side surface 13 and the right side surface 14 adjacently to the recess 23A and on a side of a surface of the tire side portion 3 by the flat surfaces 27c, 27d.

Each one of the front side surface 13 of the projection 11 shown in FIG. 18B is formed of two curved surfaces 28a, 28b having a semicircular cross-sectional shape respectively. One recess 23A having a semicircular cross-sectional shape is formed by each of the curved surfaces 28a of the projection 11 on a top surface 12 side, and one recess 23B substantially having the same semicircular cross-sectional shape as the recess 23A is formed by the curved surface 28b adjacently to the recess 23A on a surface side of the tire side portion 3.

The front side surface 13 of the projection 11 may be formed of three or more recesses disposed adjacently to each other in a tire radial direction as viewed in an end surface view.

By properly setting shapes, sizes and the numbers of the recesses formed on the front side surface 13 shown in FIG. 17A to FIG. 18B, it is possible to adjust a flow rate ratio between an air flow AF1 which flows along the top surface 12 of the projection 11 and an air flow AF2 which flows along the front side surface 13 of the projection 11.

One projection 11 may be formed by combining either one of the shape of top surface 12 shown in FIG. 16A to FIG. 16C and either one of the shape of the front side surface 13 shown in FIG. 17A to FIG. 18B.

With reference to FIG. 5 and FIG. 16A to FIG. 18B, an angle made by the top surface 12 and the front side surface 13 of the projection 11 on the front side edge portion 17, that is, a tip end angle a2 of the projection 11 is defined as an angle made by a straight line Lt which corresponds to the top surface 12 and a straight line Lfs which corresponds to a portion of the front side surface 13 in the vicinity of the front side edge portion 17 as viewed in an end surface view.

The straight line Lt is defined as a straight line which passes a portion of the top surface 12 having the largest thickness tRp, and extends along a surface of the tire side portion 3. With reference to FIG. 5 and FIG. 17A to FIG. 18B, when the top surface 12 is a flat surface extending along a surface of the tire side portion 3, a straight line which is obtained by extending the top surface 12 per se as viewed in an end surface view is the straight line Lt. With reference to FIG. 16A to FIG. 16C, when the top surface 12 is formed of a curved surface, a straight line which passes a position P3 where the top surface 12 has the largest thickness tRp as viewed in an end surface view and extends along a surface of the tire side portion 3 is the straight line Lt.

With reference to FIG. 5 and FIG. 16A to FIG. 15C, when the front side surface 13 is formed of a single flat surface, a straight line which is obtained by extending the front side surface 13 per se or the right side surface 14 per se as viewed in an end surface view is the straight line Lfs. With reference to FIG. 17A to FIG. 17D, when the front side surface 13 is formed of a single recess 23, a straight line which connects the front side edge portion 17 and the most recessed position of the recess 23 as viewed in an end surface view is the straight line Lfs. With reference to FIG. 18A and FIG. 18B, when a plurality of recesses 23A, 23B (in this example, two recesses) is formed on the front side surface 13 and the right side surface 14 respectively, a straight line which connects the front side edge portion 17 and the most recessed position of the recess 23A positioned on the most top surface 12 side as viewed in an end surface view is the straight line Lfs.

What is claimed is:

1. A pneumatic tire comprising projections on a surface of a tire side portion, wherein
each projection includes a top surface, a front side surface which is a side surface at a tire rotational direction side, a front edge portion where the top surface and the front side surface intersect with each other and an outer end surface which is a side surface at a tire outer radial direction side,
the front edge portion of the projection intersects at an angle to a straight line extending in a tire radial direction as viewed in a tire width direction,
a tip angle made by the top surface and the front side surface on the edge portion of the projection is equal to or less than 100°,
the outer end surface includes a projecting portion having an inclination side surface which is inclined in a tire rotating reverse direction toward a tire outer radial direction,
wherein the inclination side surface of the projecting portion intersects at an intersection point on the outer end surface displaced from the front side edge portion in a tire circumferential direction,
wherein the projections include more than three kinds of projections having different lengths hn in a tire circumferential direction, and
wherein the more than three kinds of projections have differing front edge portion inclination angles.

2. The pneumatic tire according to claim 1, wherein
an angle b made by the inclination side surface of the projecting portion and a straight line extending in a tire radial direction through an intersection of the inclination side surface and the outer side surface satisfies 10°≤b≤45°.

3. The pneumatic tire according to claim 2, wherein the angle between the front edge portion and the straight line extending in a tire radial direction is larger than the angle b.

4. The pneumatic tire according to claim 2, wherein the angle between the front edge portion and the straight line extending in a tire radial direction is smaller than the angle b.

5. The pneumatic tire according to claim 2, wherein the angle between the front edge portion and the straight line extending in a tire radial direction meets the following formula: $23° \leq angle \leq 43°$.

6. The pneumatic tire according to claim 2, wherein the angle between the front edge portion and the straight line extending in a tire radial direction meets the following formula: $113° \leq angle \leq 133°$.

7. The pneumatic tire according to claim 1, wherein the tip angle is further equal to or less than 90°.

8. The pneumatic tire according to claim 7, wherein the tip angle is further less than 90°.

9. The pneumatic tire according to claim 1, wherein the front side surface is displaced in one of a tire circumferential direction toward a tire outer radial direction.

10. The pneumatic tire according to claim 9, wherein the front side surface is displaced in a tire rotating reverse direction toward a tire outer radial direction.

* * * * *